US010753568B2

(12) United States Patent
Salter et al.

(10) Patent No.: US 10,753,568 B2
(45) Date of Patent: Aug. 25, 2020

(54) VEHICLE COMMUNICATION GRILLE

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Pietro Buttolo, Dearborn Heights, MI (US); James J. Surman, Clinton Township, MI (US); Annette Lynn Huebner, White Lake, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 146 days.

(21) Appl. No.: 15/596,280

(22) Filed: May 16, 2017

(65) Prior Publication Data

US 2018/0334088 A1  Nov. 22, 2018

(51) Int. Cl.
| | | |
|---|---|---|
| *F21S 43/19* | (2018.01) |
| *B60R 19/52* | (2006.01) |
| *B60Q 1/28* | (2006.01) |
| *B60Q 1/22* | (2006.01) |
| *B60Q 1/44* | (2006.01) |
| *B60Q 1/50* | (2006.01) |
| *F21Y 115/10* | (2016.01) |
| *F21S 43/20* | (2018.01) |
| *F21S 43/14* | (2018.01) |

(52) U.S. Cl.
CPC .............. *F21S 43/195* (2018.01); *B60Q 1/22* (2013.01); *B60Q 1/28* (2013.01); *B60Q 1/442* (2013.01); *B60Q 1/50* (2013.01); *B60Q 1/506* (2013.01); *B60R 19/52* (2013.01); *B60R 2019/525* (2013.01); *F21S 43/14* (2018.01); *F21S 43/26* (2018.01); *F21Y 2115/10* (2016.08)

(58) Field of Classification Search
CPC .......... B60Q 1/2661; B60Q 1/34; B60Q 1/28; B60Q 1/2696; B60Q 1/22; F21S 43/195; F21S 43/26; F21S 43/14; B60R 19/52; B60R 2019/525; F21Y 2115/10
See application file for complete search history.

(56) References Cited

U.S. PATENT DOCUMENTS

| 7,095,318 B1 | 8/2006 | Bekhor |
| 7,147,355 B1 | 12/2006 | Kiler |

(Continued)

FOREIGN PATENT DOCUMENTS

| DE | 10-2004-043812 A1 | 3/2006 |
| WO | 2016/051043 A1 | 4/2016 |

OTHER PUBLICATIONS

Sovan Mandal, Autonomous car smiles at pedestrians, is this the future of self-driving tech?, Auto World News, Sep. 16, 2016, three pages.

(Continued)

*Primary Examiner* — Kevin Quarterman
(74) *Attorney, Agent, or Firm* — David Coppiellie; Carlson, Gaskey & Olds

(57) ABSTRACT

A vehicle lighting system includes an illuminated grille assembly. The illuminated grille assembly includes a plurality of grille bars each having at least one light source. A control system is configured to control the illuminated grille assembly to emit combinations of lighting effects from the plurality of grille bars for indicating a plurality of visually distinctive operating behaviors of the vehicle.

14 Claims, 7 Drawing Sheets

(56) References Cited

U.S. PATENT DOCUMENTS

| | | | |
|---|---|---|---|
| 8,954,252 B1 | 2/2015 | Urmson et al. | |
| 9,475,422 B2 | 10/2016 | Hillis et al. | |
| 9,513,632 B1 | 12/2016 | Gordon et al. | |
| 9,586,518 B2 | 3/2017 | Salter et al. | |
| 9,783,122 B1* | 10/2017 | VanEpps | B60R 11/00 |
| 2005/0094409 A1* | 5/2005 | Elwell | B60Q 1/2661 |
| | | | 362/496 |
| 2006/0114686 A1* | 6/2006 | Liu | B60Q 1/2661 |
| | | | 362/496 |
| 2009/0010494 A1* | 1/2009 | Bechtel | B60Q 1/1423 |
| | | | 382/104 |
| 2009/0072556 A1* | 3/2009 | Kudelko | B60R 19/52 |
| | | | 293/115 |
| 2015/0138807 A1* | 5/2015 | Salter | B60Q 1/2661 |
| | | | 362/510 |
| 2016/0288700 A1* | 10/2016 | Chen | F21S 43/15 |
| 2017/0113618 A1* | 4/2017 | Deyaf | B60R 1/12 |
| 2017/0210285 A1* | 7/2017 | Kobayashi | B60Q 1/50 |
| 2018/0170247 A1* | 6/2018 | Ramos, II | B60Q 1/28 |
| 2018/0272927 A1* | 9/2018 | Moore | B60Q 1/2661 |

OTHER PUBLICATIONS

Laurie Winkless, Reading the road: how will driverless cars talk to pedestrians?, Jan. 4, 2017, https://www.forbes.com/sites/lauriewinkless/2017/01/04/reading-the-road-how-wiull-driverles... printed Mar. 6, 2017.

The Mercedes-Benz F 015 Luxury in Motion, 10 pages, https://www.mercedes-benz.com/en/mercedes-benz/innovation/research-vehicle-f-015-luxur..., printed Mar. 6, 2017.

* cited by examiner

E6

E7

E8

E9

VEHICLE COMMUNICATION GRILLE

TECHNICAL FIELD

This disclosure relates to vehicle lighting systems. An exemplary vehicle lighting system includes an illuminated grille assembly adapted to indicate a plurality of visually distinctive operating behaviors of a vehicle.

BACKGROUND

Vehicle lighting systems include a multitude of lighting and signaling devices for illuminating the vehicle and alerting others of the vehicle's presence and the driving intentions of the vehicle. Even when equipped with such a lighting system, the operating intentions of a vehicle are not always clear to other drivers/pedestrians. Providing visible indications of the vehicle operating intentions may be particularly important for autonomous vehicles, i.e., vehicles that can be operated either wholly or partially without input from a human operator.

SUMMARY

A vehicle lighting system according to an exemplary aspect of the present disclosure includes, among other things, an illuminated grille assembly including a plurality of grille bars each having at least one light source and a control system configured to control the illuminated grille assembly to emit combinations of lighting effects from the plurality of grille bars for indicating a plurality of visually distinctive operating behaviors of the vehicle.

In a further non-limiting embodiment of the foregoing vehicle lighting system, the plurality of visually distinctive operating behaviors are visually distinctive in terms of at least color and brightness.

In a further non-limiting embodiment of either of the foregoing vehicle lighting systems, the plurality of visually distinctive operating behaviors are visually distinctive in terms of a total amount of the plurality of grille bars that are illuminated.

In a further non-limiting embodiment of any of the foregoing vehicle lighting systems, each of the plurality of grille bars include a housing, the at least one light source, and at least one optic device.

In a further non-limiting embodiment of any of the foregoing vehicle lighting systems, the housing includes a metallic film secured to a plastic part and a plastic backing secured to the plastic part.

In a further non-limiting embodiment of any of the foregoing vehicle lighting systems, a printed circuit board (PCB) is housed within the housing.

In a further non-limiting embodiment of any of the foregoing vehicle lighting systems, the at least one light source is a light emitting diode (LED).

In a further non-limiting embodiment of any of the foregoing vehicle lighting systems, the LED is a multi-colored LED.

In a further non-limiting embodiment of any of the foregoing vehicle lighting systems, the control system is configured to turn a first portion of the light sources ON and turn a second portion of the light sources OFF to create a symbol within the illuminated grille assembly.

In a further non-limiting embodiment of any of the foregoing vehicle lighting systems, the vehicle is an autonomous vehicle.

A method according to another exemplary aspect of the present disclosure includes, among other things, producing a first lighting effect on an illuminated grille assembly to indicate a first operating behavior of a vehicle, and producing a second lighting effect on the illuminated grille assembly to indicate a second operating behavior of the vehicle that is different from the first operating behavior.

In a further non-limiting embodiment of the foregoing method, the first lighting effect indicates that the vehicle is stopped and in park and the second lighting effect indicates that the vehicle is about to move forward.

In a further non-limiting embodiment of either of the foregoing methods, the method includes producing another lighting effect on the illuminated grille assembly to indicate that the vehicle is about to stop or delay its start.

In a further non-limiting embodiment of any of the foregoing methods, the method includes producing another lighting effect on the illuminated grille assembly to indicate a traveling speed of the vehicle.

In a further non-limiting embodiment of any of the foregoing methods, the method incudes producing another lighting effect on the illuminated grille assembly to indicate that the vehicle is turning.

In a further non-limiting embodiment of any of the foregoing methods, the method includes producing another lighting effect on the illuminated grille assembly to indicate that the vehicle is out of service.

In a further non-limiting embodiment of any of the foregoing methods, producing another lighting effect includes controlling one or more light sources of the illuminated grilled assembly to display a symbol on the illuminated grille assembly.

In a further non-limiting embodiment of any of the foregoing methods, the method includes producing another lighting effect on the illuminated grille assembly to indicate that the vehicle requires service.

In a further non-limiting embodiment of any of the foregoing methods, the method includes producing another lighting effect on the illuminated grille assembly to indicate an emergency situation.

In a further non-limiting embodiment of any of the foregoing methods, the method includes producing another lighting effect on the illuminated grille assembly to indicate that the vehicle is in reverse.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details illuminated grille assemblies for providing visual feedback of vehicle operation. An exemplary vehicle lighting system includes an illuminated grille assembly. Each individual grille bar of the illuminated grille assembly may emit various lighting effects for indicating a plurality of visually distinctive operating behaviors of the vehicle. These and other features of this disclosure are described in greater detail below.

Figure 1:
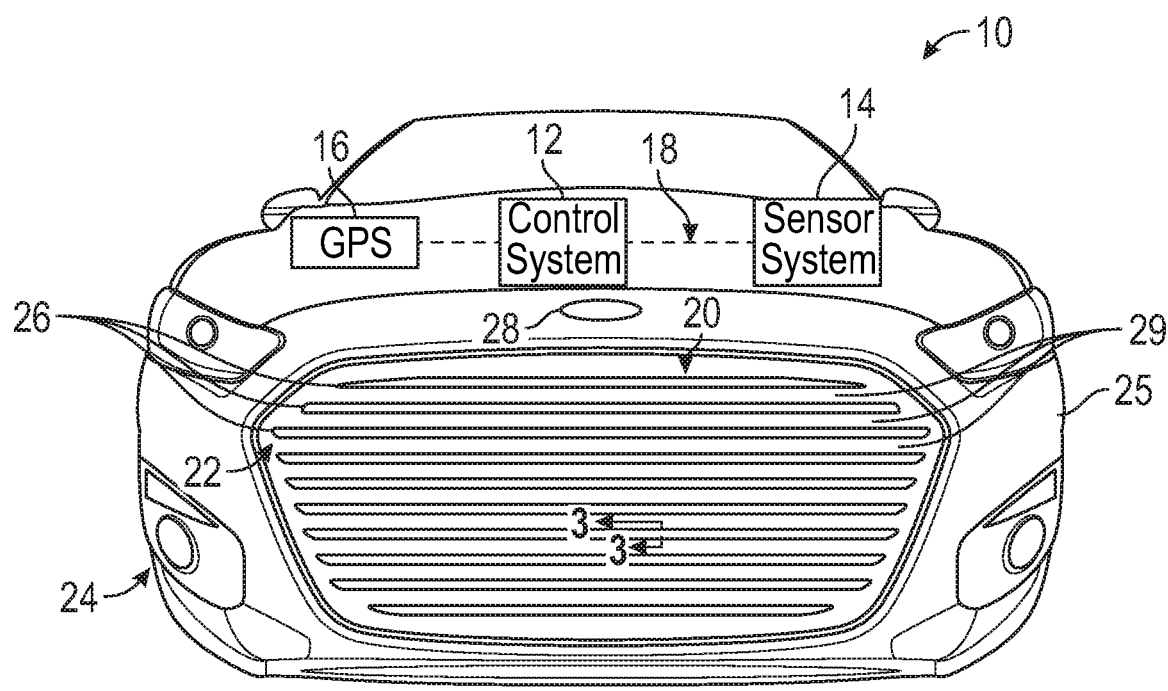
FIG. 1 illustrates a vehicle equipped with an illuminated grille assembly.

FIG. 1 schematically illustrates a vehicle 10. The vehicle 10 may be a car, a truck, a van, or any other vehicle. Although a specific component relationship is illustrated in the figures of this disclosure, the illustrations are not intended to limit this disclosure. In other words, the placement and orientation of the various components of the vehicle 10 are shown schematically and could vary within the scope of this disclosure.

In an embodiment, the vehicle 10 is an autonomous vehicle (i.e., driverless vehicle) capable of sensing its environment and navigating between locations with little to no human input. In autonomous vehicle embodiments, the vehicle 10 may include a control system 12, a sensor system 14, and a global positioning system (GPS) 16 that are capable of communicating with one another for controlling operation of the vehicle 10 with little to no human input. The vehicle 10 may include various other systems and components for achieving driverless functionality. In an embodiment, the control system 12, the sensor system 14, the GPS 16, and various other systems (e.g., steering, braking, accelerating, etc.) communicate with one another over a controlled area network (CAN) 18.

The sensor system 14 may communicate with the control system 12 for providing information about the environment within which the vehicle 10 is operating. The sensor system 14 may include various cameras, radar, and lasers that provide raw information about the surrounding environment. This information can be analyzed and processed by the control system 12 for controlling the autonomous vehicle 10, such as along a desired route. The GPS 16 may also communicate with the control system 12 for providing information such as vehicle position, speed, and directionality. A map database is stored within the GPS 16 or can be remotely accessed by the GPS 16 (e.g., over a wireless data connection) for route planning and monitoring.

The vehicle 10 may be equipped with an illuminated grille assembly 20. The illuminated grille assembly 20 may be part of a vehicle lighting system of the vehicle 10. In an embodiment, the illuminated grille assembly 20 generally covers an opening 22 in a front portion 24 of the vehicle 10. Although an illuminated grille assembly for the front portion 24 of the vehicle 10 is described herein, illuminated grille assemblies in other vehicle locations could be similarly configured.

The illuminated grille assembly 20 may be mounted to a portion of a vehicle body 25. In an embodiment, the illuminated grille assembly 20 is mounted to a front end assembly of the vehicle body 25. Other mounting locations are also contemplated within the scope of this disclosure.

The illuminated grille assembly 20 may include a plurality of grille bars 26. Although depicted as having ten grille bars 26, the total number of grille bars 26 of the illuminated grille assembly 20 is not intended to limit this disclosure. Thus, the illuminated grille assembly 20 could include a greater or fewer number of grille bars 26 within the scope of this disclosure.

The plurality of grille bars 26 may be arranged in a spaced relationship relative to one another. This spaced relationship establishes a gap 29 between adjacent grille bars 26. Air may enter the engine compartment of the vehicle 10 through the gaps 29 for cooling various parts, such as the engine and the radiator, for example.

Figure 2:
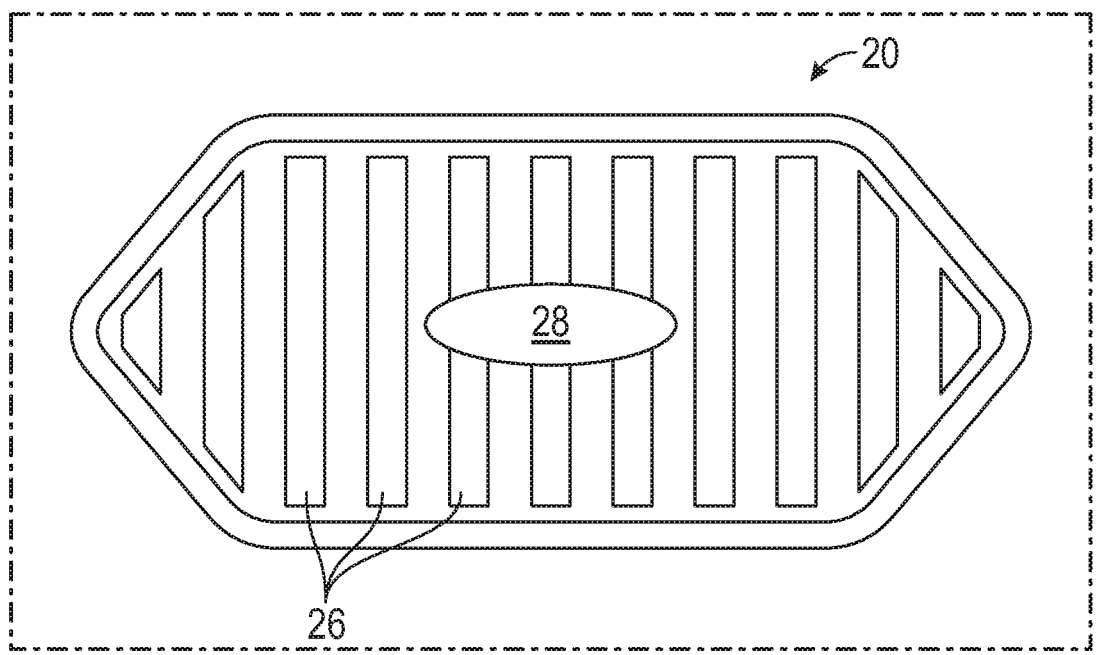
FIG. 2 illustrates another exemplary illuminated grille assembly.

The grille bars 26 may be arranged to extend horizontally (see, e.g., FIG. 1) or vertically (see, e.g., FIG. 2) relative to the front portion 24 of the vehicle 10. In another embodiment, the grille bars 26 are arranged in a crosshatched configuration. The grille bars 26 could also embody either linear or non-linear configurations within the scope of this disclosure.

The vehicle 10 may additionally include a badge 28 for identifying the make and/or model of the vehicle 10. In an embodiment, the badge 28 is mounted remotely from the illuminated grille assembly 20 (see, e.g., FIG. 1). In another embodiment, the badge 28 is mounted to or is integral component of the illuminated grille assembly 20 (see, e.g., FIG. 2). Separate from their various other utilities, the illuminated grille assembly 20 and the badge 28 may function as styling elements for enhancing the appearance of the vehicle 10.

The illuminated grille assembly 20 can be selectively controlled to create a combination of lighting effects (e.g., in terms of color, brightness, number of grille bars illuminated, flashing, pulsing, etc.) that provide visual feedback of various operating behaviors of the vehicle 10 to both pedestrians and operators of other vehicles. As will be discussed below in greater detail, each grille bar 26 of the illuminated grille assembly 20 can be configured to emit light to create a combination of lighting effects for communicating information to pedestrians and/or other vehicle operators. In an embodiment, since it is mounted at the front portion 24 of the vehicle 10, the illuminated grille assembly 20 provides visual feedback to the front of the vehicle 10

In an embodiment, the illuminated grille assembly 20 is controlled by the control system 12. The control system 12 may include one more control modules equipped with executable instructions for interfacing with and commanding operation of various components of the vehicle 10, including but not limited to the illuminated grille assembly 20. Each such control module may include a processing unit and non-transitory memory for executing the various control strategies and modes of the vehicle 10. The processing unit, in an embodiment, is configured to execute one or more programs stored in the memory of the control system 12. A first exemplary program, when executed, may determine when and how to illuminate (or, optionally, not to illuminate) the grille bars 26 of the illuminated grille assembly 20. The control system 12 may control various other functions associated with the illuminated grille assembly 20 of the vehicle 10.

Figure 3:
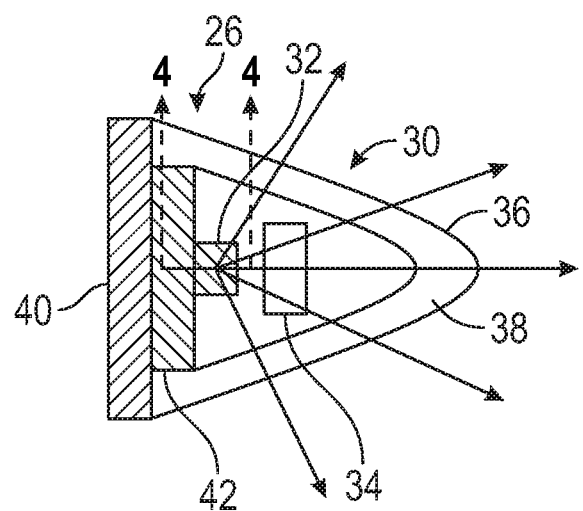
FIG. 3 is a sectional view through a grille bar of the illuminated grille assembly of FIG. 1.

FIG. 3 is a cross-sectional view of one of the grille bars 26 of the illuminated grille assembly 20. The various other grille bars 26 of the illuminated grille assembly 20 could be configured in a similar manner.

In an embodiment, each grille bar 26 of the illuminated grille assembly 20 includes a housing 30, one or more light sources 32, and one or more optic devices 34. Although not specifically shown or described, the illuminated grille assembly 20 could include additional components such as reflectors, thermal transfer devices, sealing devices, etc.

The housing 30 may be manufactured in a variety of ways. In an embodiment, the housing 30 includes a metallic film 36, a plastic section 38, and a plastic backing 40. The plastic section 38 may be insert molded on or otherwise secured to the back of the metallic film 36. In an alternative embodiment, the metallic film 36 can be applied to the plastic section 38 via partial vacuum deposition.

The plastic backing 40 may be assembled together with the plastic section 38 and the metallic film 36 to establish the housing 30. The plastic backing 40 may be low pressure over molded, low-pressure insert molded, potted, etc.

The metallic film 36 gives the housing 30 a metallic (i.e., chrome-like) appearance. In an embodiment, the metallic film 36 is an aluminum film; however, other metallic films could also be utilized. The metallic film 36 may be light permeable to allow light from the light sources 32 to escape from the inside to the outside of the housing 30. The metallic film 36 may therefore behave similarly to a two-way mirror.

The plastic section 38 may be constructed from a rigid material that is also light permeable. In an embodiment, the plastic section 38 is constructed from an acrylic material, such as acrylic plastic, for example. However, other plastic materials are also contemplated within the scope of this disclosure. The light that is ultimately emitted through the plastic section 38 and the metallic film 36 of the housing 30 provides visual feedback of various operating behaviors of the vehicle 10 to pedestrians and/or operators of other vehicles.

The housing 30 houses each light source 32 and each optic device 34 of each grille bar 26. The optic device(s) 34 focuses the light emitted by the light source(s) 32, such as in a narrow pattern that can be emitted with a desired directionality through the housing 30. In an embodiment, the optic device 34 is positioned in front of the light source 32 (i.e., between the light source 32 and the plastic section 38). In another embodiment, in addition to its various other functions, the plastic section 38 may function as an optic device.

Each light source 32 may be a light emitting diode (LED). In an embodiment, the light source 32 is a multi-colored LED, such as a Red, Green, and Blue (RGB) LED, for example. Other light sources could also be utilized within the scope of this disclosure. The light sources 32 may be powered by a vehicle power supply system, for example.

Figure 4:
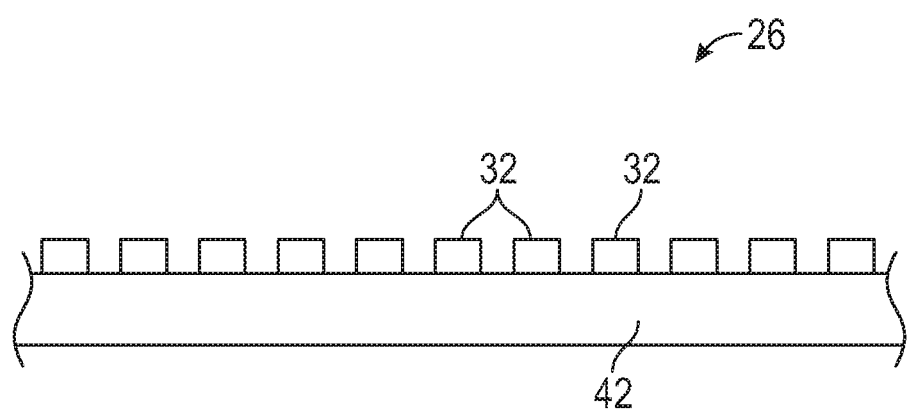
FIG. 4 is a sectional view through a portion of the grille bar of FIG. 3.

The illuminated grille assembly 20 may include a plurality of the light sources 32 arranged in a spaced relationship along a printed circuit board (PCB) 42 (see, e.g., FIG. 4). The PCB 42 may extend longitudinally inside the housing 30 and could extend across the entire length of the grille bar 26. The PCB 42 may be mounted to the plastic backing 40. The total number of light sources 32 may vary and is vehicle dependent. In an embodiment, the illuminated grille assembly 20 includes a sufficient number of light sources 32 for visualizing the combination of lighting effects emitted therefrom during both daytime conditions and nighttime conditions.

Each light source 32 of each grille bar 26 of the illuminated grille assembly 20 can be selectively controlled either individually or as a unit, such as via the control system 12, to generate various lighting effects that can be emitted by the illuminated grille assembly 20 for indicating the different operating behaviors of the vehicle 10. FIGS. 5-15 (with continued reference to FIGS. 1-4) schematically illustrate various examples of such operating behaviors. It should be understood that the illustrated operating behaviors are intended as non-limiting examples of the type of visual cues that can be created by the illuminated grille assembly 20. Where appropriate, a legend is included in these figures to aid the understanding of each exemplary operating behavior.

Figure 5:
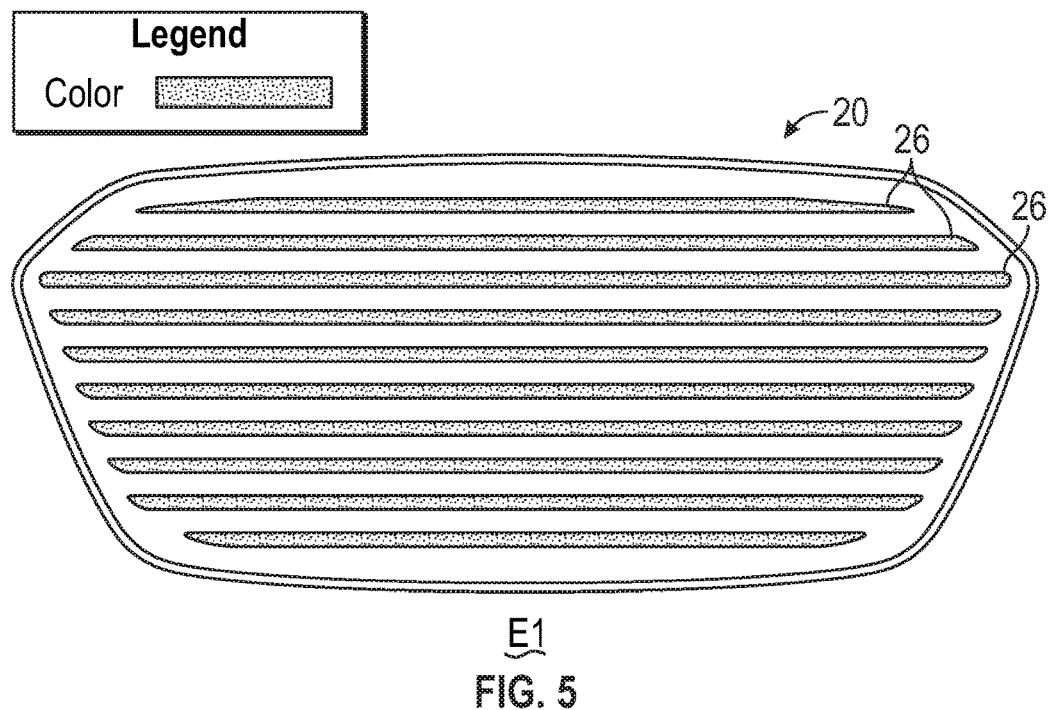
FIG. 5 schematically illustrates a first lighting effect that can be indicated by an illuminated grille assembly.

FIG. 5 schematically illustrates a first exemplary lighting effect E1 that can be generated by the illuminated grille assembly 20 for indicating a first operating behavior of the vehicle 10. For example, the first lighting effect E1 can be emitted from the illuminated grille assembly 20 to indicate that the vehicle 10 is stopped and in park (i.e., gear selector positioned in park gear).

If the first lighting effect E1 has been commanded by the control system 12, each grille bar 26 of the illuminated grille assembly 20 emits light having the same color. In an embodiment, the color is amber. In another embodiment, the color is red. Each grille bar 26 could be illuminated with the same level of brightness. The first lighting effect E1 provides a clear indication to pedestrians and other vehicles that the vehicle 10 is not preparing to move.

Figure 6:
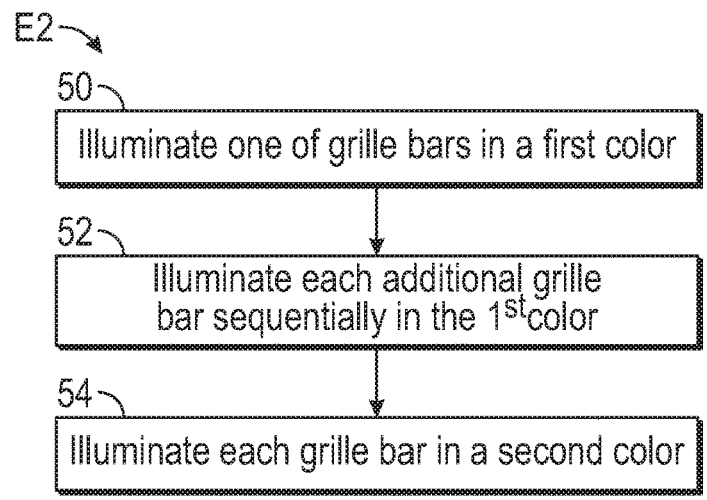
FIG. 6 schematically illustrates a second lighting effect that can be indicated by an illuminated grille assembly.

FIG. 6 schematically illustrates a second exemplary lighting effect E2 that can be generated by the illuminated grille assembly 20 for indicating a second, different operating behavior of the vehicle 10. For example, the second lighting effect E2 can be emitted from the illuminated grille assembly 20 to indicate that the vehicle 10 is stopped but about to move forward (i.e., gear selector positioned in a drive gear).

If the second lighting effect E2 has been commanded by the control system 12, a first of the grille bars 26 of the illuminated grille assembly 20 may be illuminated in a first color (e.g., green), which is shown schematically at block 50. The remaining grille bars 26 are then illuminated, in sequential order, in the first color (see block 52). In an embodiment, the grille bars 26 can be illuminated sequentially from the bottom up or from the top down. Alternatively, such as for a vertical grille bar arrangement, the grille bars 26 could be illuminated sequentially from left to right or from right to left. Sequentially illuminating the grille bars 26 in this manner provides the visual effect of a countdown for alerting pedestrians and other drivers of impending vehicle movement.

In an embodiment, the grille bars 26 are illuminated sequentially over a predefined period of time during blocks 50 and 52. The predefined period of time could be about 10 seconds, for example, but is not limited to this time period.

After all the grille bars 26 of the illuminated grille assembly 20 have been illuminated in the first color and the vehicle 10 begins to move, the color of each grille bar 26 can be changed to a second color (e.g., white). This is shown schematically at block 54. Each grille bar 26 could be illuminated with the same level of brightness. The second lighting effect E2 provides a clear indication to pedestrians and other vehicles that the vehicle 10 is preparing to move.

Figure 7:
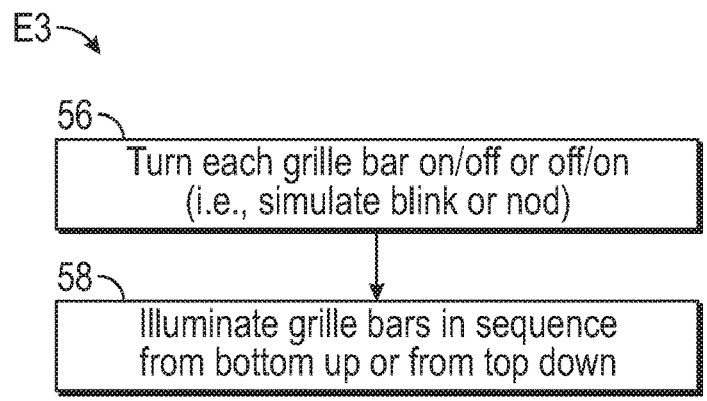
FIG. 7 schematically illustrates a third lighting effect that can be indicated by an illuminated grille assembly.

FIG. 7 schematically illustrates a third exemplary lighting effect E3 that can be generated by the illuminated grille assembly 20 for indicating another operating behavior of the vehicle 10. For example, the third lighting effect E3 can be emitted from the illuminated grille assembly 20 to indicate that a pedestrian has been identified near the vehicle 10 and that the vehicle will either stop or delay movement.

If the third lighting effect E3 has been commanded by the control system 12, the illuminated grille assembly 20 can simulate a "blink" or "nod" to the pedestrian by turning the lights of each grille bar 26 OFF and then ON again (or, alternatively, ON and then OFF again). This is schematically illustrated at block 56. Next, as shown at block 58, each grille bar 26 can be illuminated in sequence from the bottom up or from the top down. Each grille bar 26 could be illuminated with the same level of brightness during blocks 56 and 58. The third lighting effect E3 provides a clear indication to pedestrians that the vehicle 10 is preparing to stop or will temporarily delay further movement.

Figure 8:
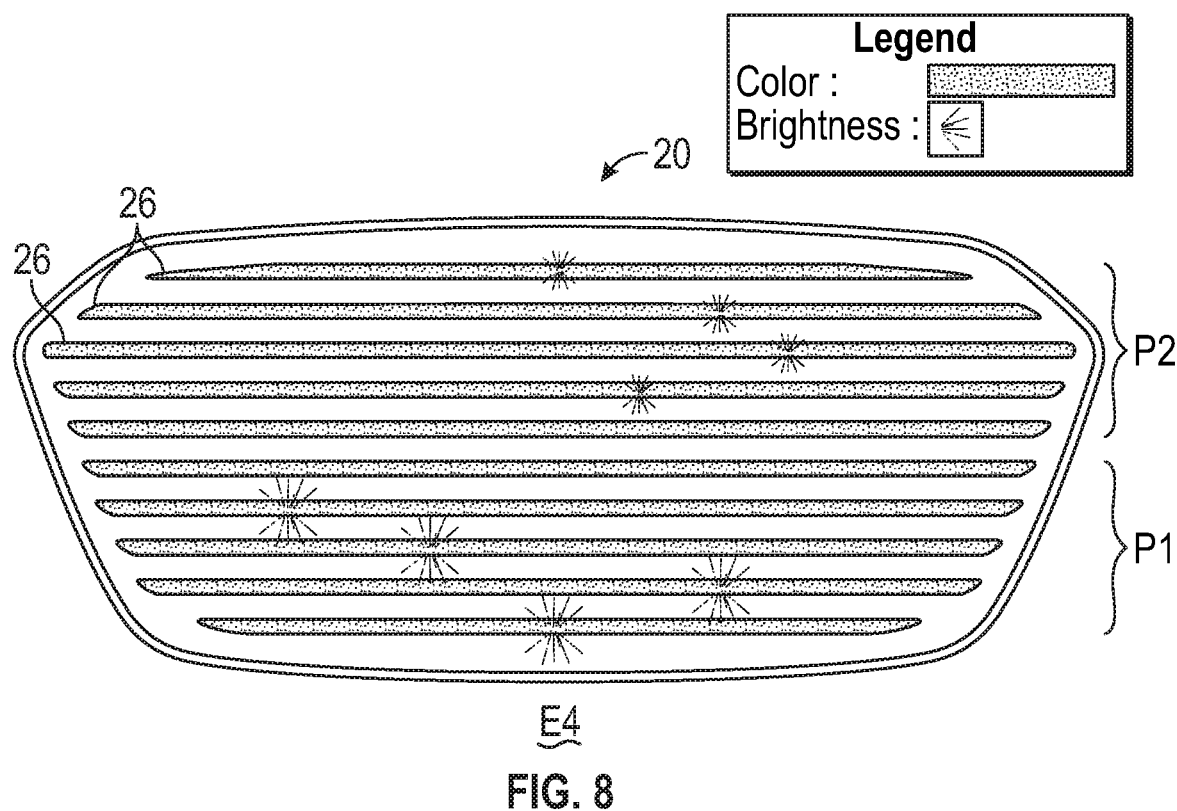
FIG. 8 schematically illustrates a fourth lighting effect that can be indicated by an illuminated grille assembly.

FIG. 8 schematically illustrates a fourth exemplary lighting effect E4 that can be generated by the illuminated grille assembly 20 for indicating another operating behavior of the vehicle 10. For example, the fourth lighting effect E4 can be emitted from the illuminated grille assembly 20 to indicate, in general, the traveling speed of the vehicle 10.

If the fourth lighting effect E4 has been commanded by the control system 12, the illuminated grille assembly 20 can be illuminated to simulate a bar graph that provides a visual indication of how fast the vehicle 10 is traveling if the vehicle 10 is traveling below a threshold speed level. For example, a first portion P1 of the grille bars 26 can be illuminated at full brightness, while a second portion P2 of the grille bars 26 can be more dimly lit (e.g., about 20% intensity or less). The number of grille bars 26 that are more brightly lit indicate the general traveling speed of the vehicle 10. Stated another way, the more grille bars 26 that are more brightly lit, the faster the vehicle 10 is traveling.

In another embodiment, such as when the vehicle 10 is traveling above the threshold speed level, all the grille bars 26 may be changed to emit light at full intensity. In this way, the illuminated grille assembly 20 may function as daytime running lights.

Figure 9:
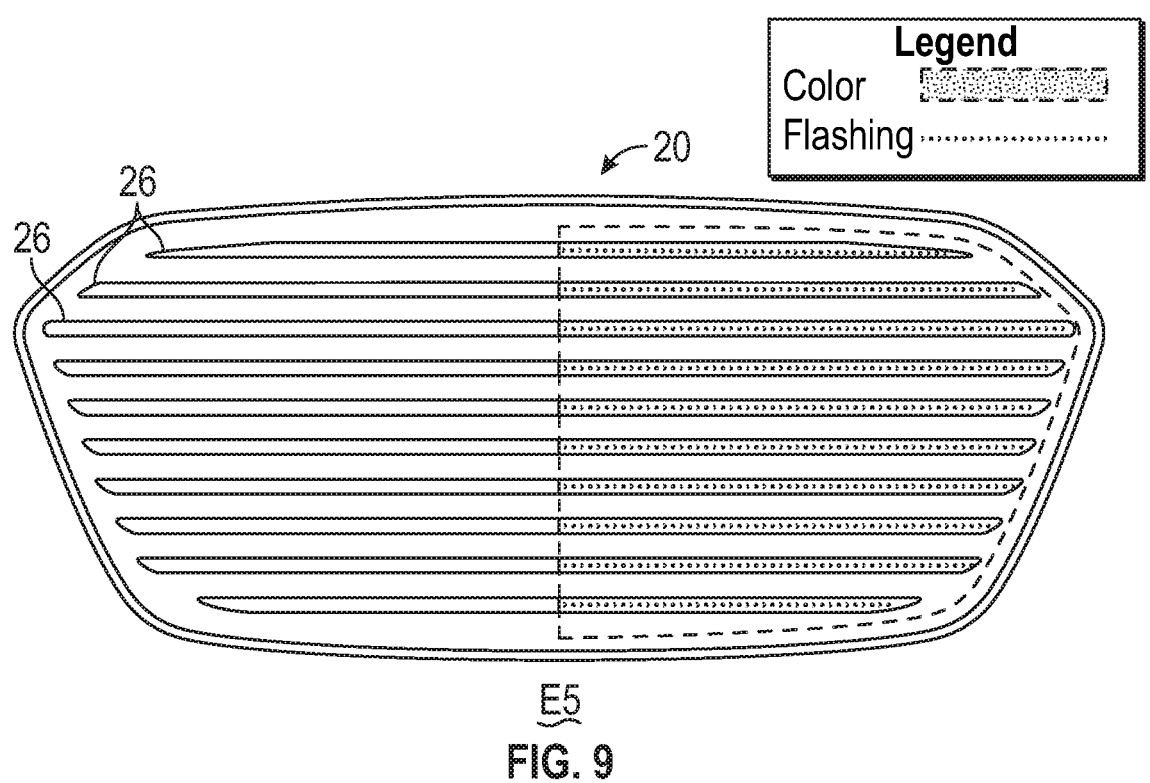
FIG. 9 schematically illustrates a fifth lighting effect that can be indicated by an illuminated grille assembly.

FIG. 9 schematically illustrates a fifth exemplary lighting effect E5 that can be generated by the illuminated grille assembly 20 for indicating yet another operating behavior of the vehicle 10. For example, the fifth lighting effect E5 can be emitted from the illuminated grille assembly 20 to indicate that the vehicle 10 is turning and the direction of the turn.

If the fifth lighting effect E5 has been commanded by the control system 12, portions of the grille bars 26 located on the side in which the vehicle 10 is turning may emit colored flashing lights in a common color (e.g., amber). The other sides of the grille bars 26 are not illuminated. The fifth lighting effect E5 thus indicates both that the vehicle 10 is turning and the direction that the vehicle 10 is turning.

Figure 10:
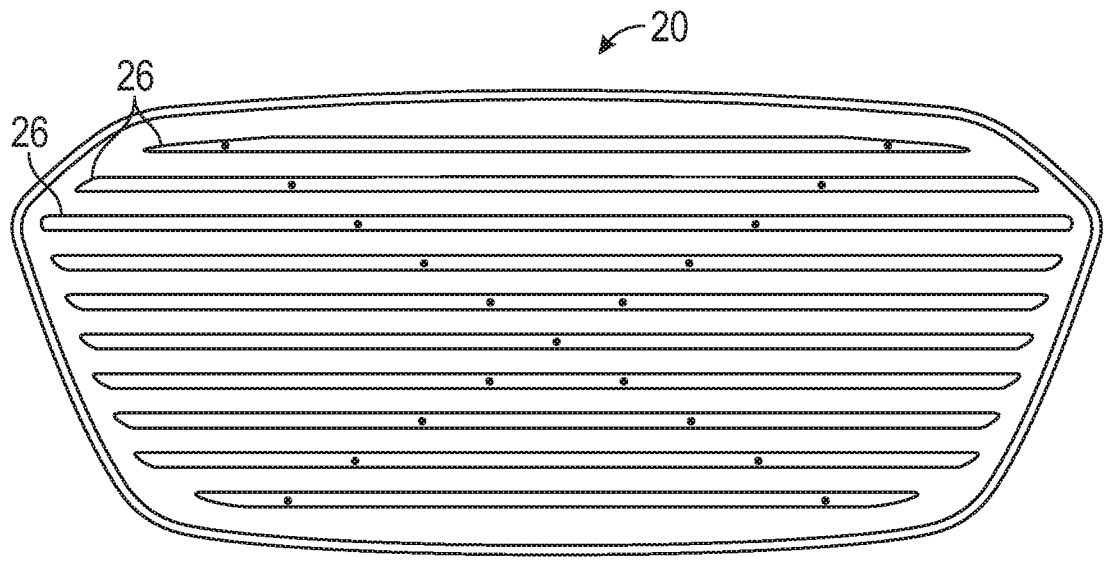
FIG. 10 schematically illustrates a sixth lighting effect that can be indicated by an illuminated grille assembly.

FIG. 10 schematically illustrates a sixth exemplary lighting effect E6 that can be generated by the illuminated grille assembly 20 for indicating another operating behavior of the vehicle 10. For example, the sixth lighting effect E6 can be emitted from the illuminated grille assembly 20 to indicate that the vehicle 10 is out of service.

If the sixth lighting effect E6 has been commanded by the control system 12, each light source 32 of each grille bar 26 can be individually controlled to either turn ON or OFF to create a desired shape or symbol in the illuminated grille assembly 20. The shape or symbol may be established either by the light sources 32 that are turned ON or those that are turned OFF (i.e., negative lighting). In the illustrated embodiment, the desired shape is an "X" to indicate that the vehicle 10 is out of service. However, various other shapes could alternatively or additionally be produced in the illuminated grille assembly 20.

Figure 11:
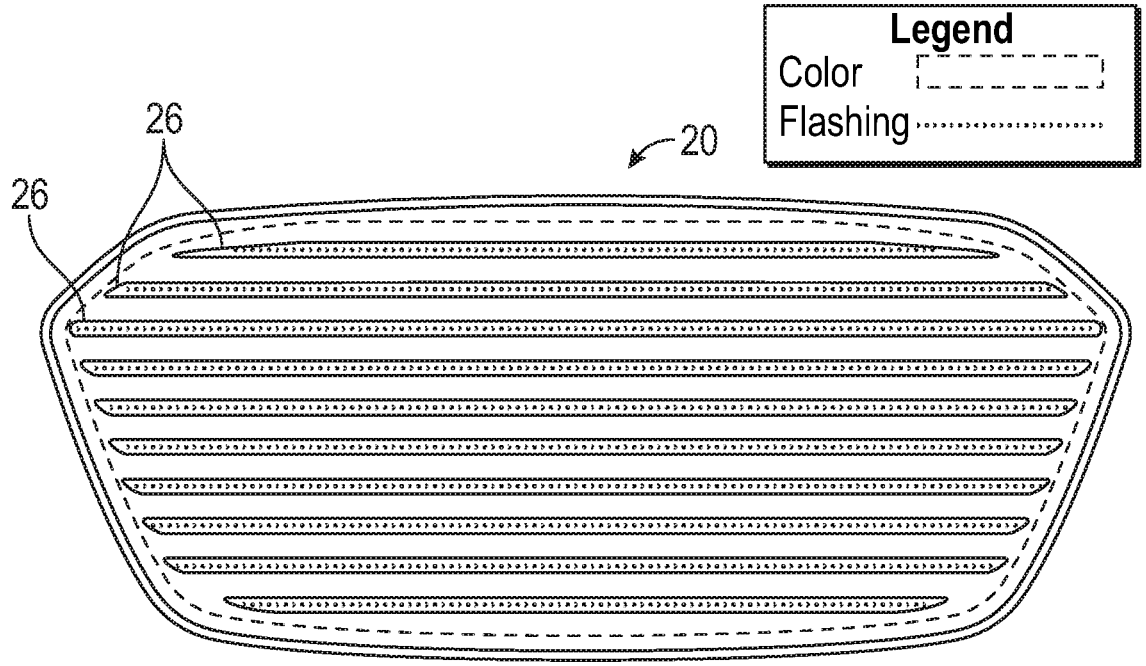
FIG. 11 schematically illustrates a seventh lighting effect that can be indicated by an illuminated grille assembly.

A seventh exemplary lighting effect E7 for indicating another operating behavior of the vehicle 10 is illustrated by FIG. 11. The seventh lighting effect E7 can be produced to indicate an emergency situation. Each grille bar 26 may emit colored flashing lights in a unitary color to indicate the emergency situation. In an embodiment, the flashing lights emitted by the illuminated grille assembly 20 are synchronized with one or more other hazard signaling devices of the vehicle 10.

Figure 12:
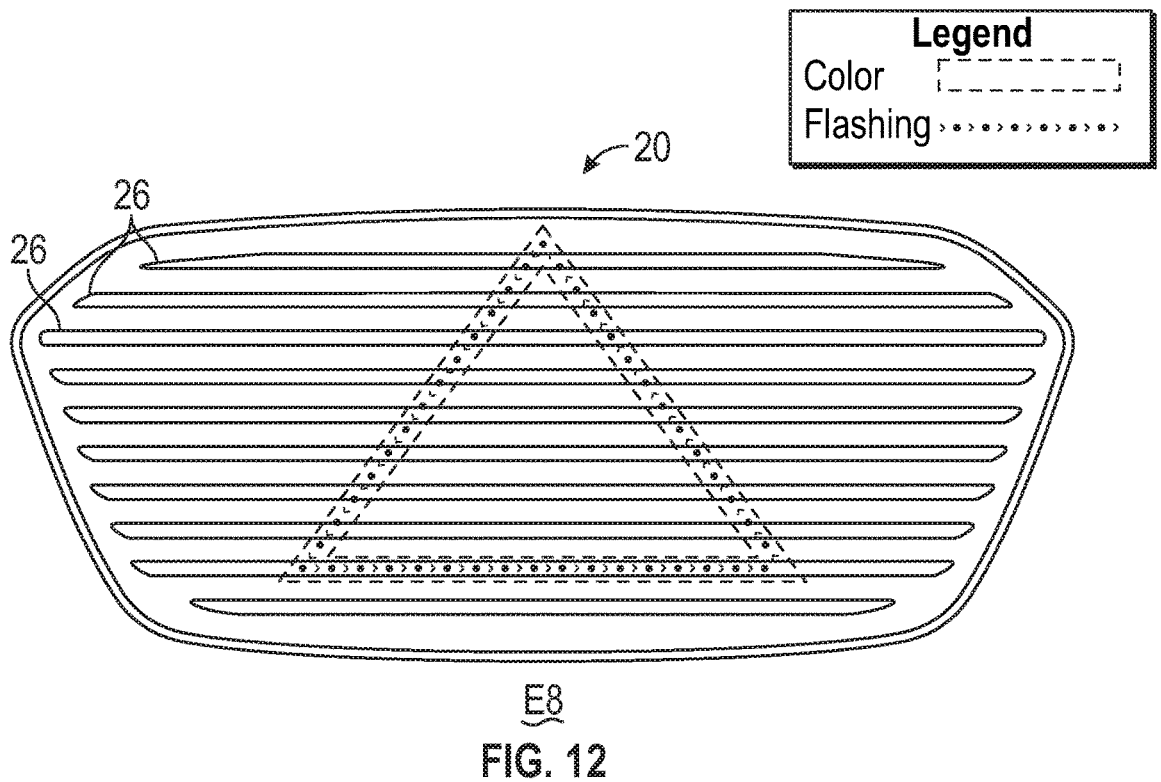
FIG. 12 schematically illustrates an eighth lighting effect that can be indicated by an illuminated grille assembly.

FIG. 12 schematically illustrates an eighth exemplary lighting effect E8 that can be generated by the illuminated grille assembly 20 for indicating that the vehicle 10 has a mechanical issue and requires service. If the eighth lighting effect E8 has been commanded by the control system 12, each light source 32 of each grille bar 26 can be individually controlled to either turn ON or OFF to create a desired shape or symbol in the illuminated grille assembly 20. The shape or symbol may be formed by either the light sources 32 that are turned ON or those that are turned OFF (i.e., negative lighting). In the illustrated embodiment, the desired shape is a warning triangle to indicate that the vehicle 10 requires service. However, various other shapes could alternatively or additionally be produced in the illuminated grille assembly 20. In yet another embodiment, the lights sources 32 that are turned ON during the eighth lighting effect E8 may also flash.

Figure 13:
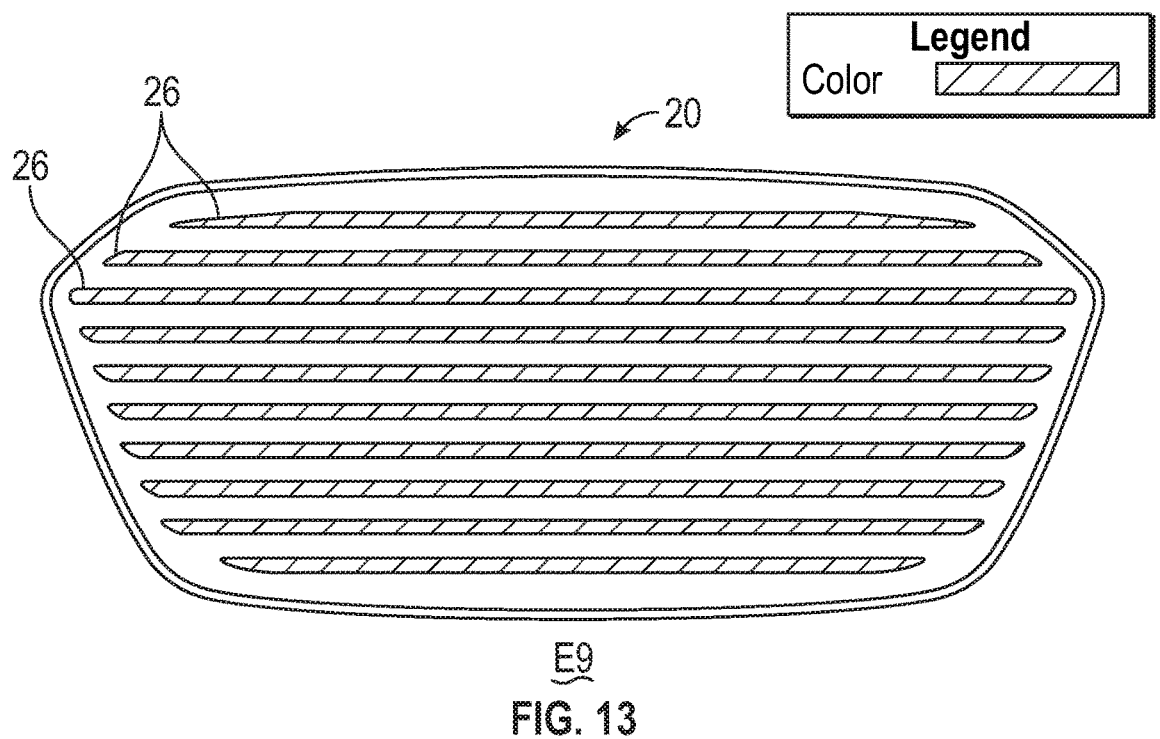
FIG. 13 schematically illustrates a ninth lighting effect that can be indicated by an illuminated grille assembly.

FIG. 13 schematically illustrates a ninth lighting effect E9 that can be generated by the illuminated grille assembly 20 for indicating the vehicle 10 is in reverse (i.e., gear selector positioned in reverse gear). If the ninth lighting effect E9 has been commanded by the control system 12, each grille bar 26 of the illuminated grille assembly 20 emits a colored light. In an embodiment, the color is red. Each grille bar 26 could be illuminated with the same level of brightness. The ninth lighting effect E9 provides a clear indication to pedestrians and other vehicles that the vehicle 10 is moving in reverse.

Figure 14:
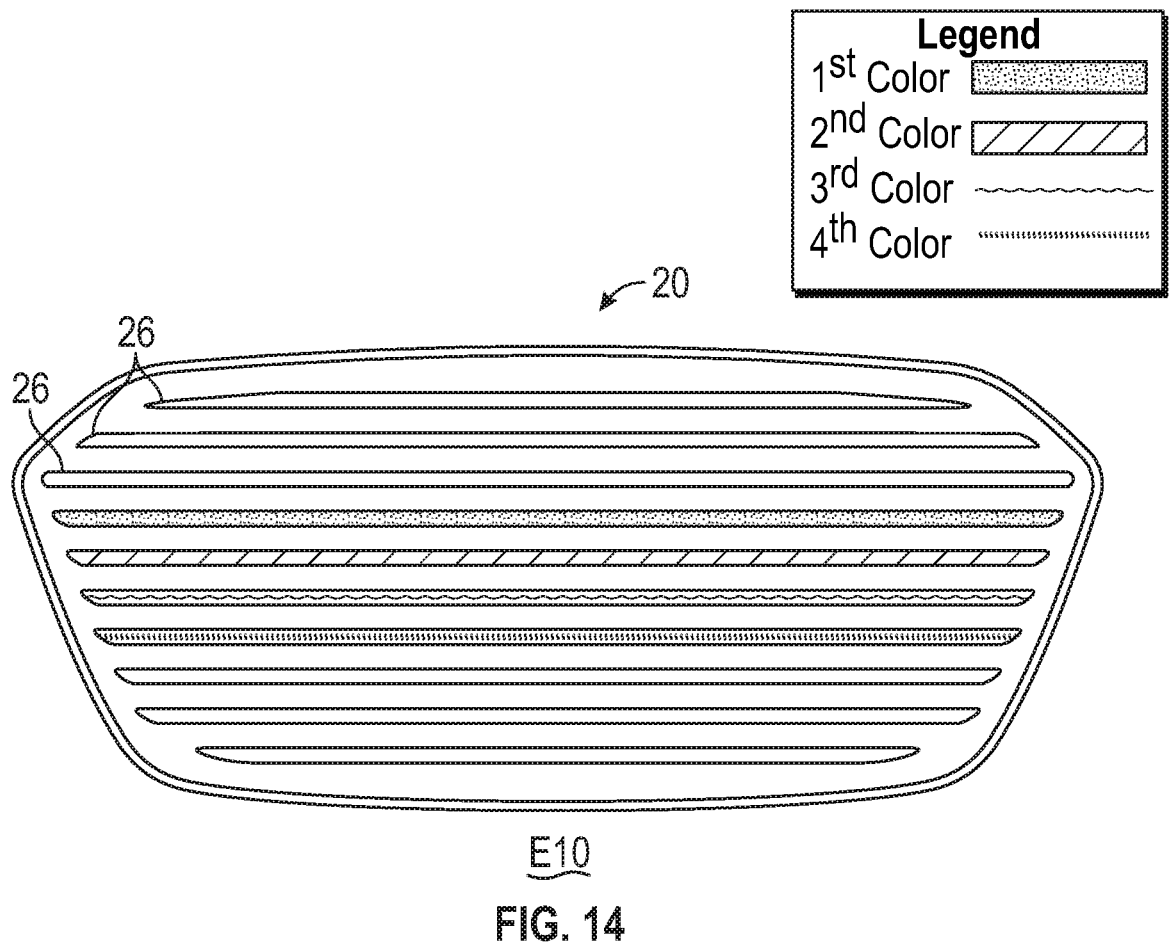
FIG. 14 schematically illustrates a tenth lighting effect that can be indicated by an illuminated grille assembly.

A tenth exemplary lighting effect E10 for indicating yet another operating behavior of the vehicle 10 is illustrated by FIG. 14. The tenth lighting effect E10 can be produced to help a customer identify the vehicle, such as a ride-share vehicle. For example, two or more grille bars 26 of the illuminated grille assembly 20 can be illuminated in different colors to establish a pattern that matches an identifying pattern on the passenger's smart device. In the illustrated, non-limiting example of FIG. 14, four grille bars 26 are illuminated, with each grille bar 26 emitting a different color. The vehicle ID pattern could be produced in various other ways within the scope of this disclosure.

Figure 15:
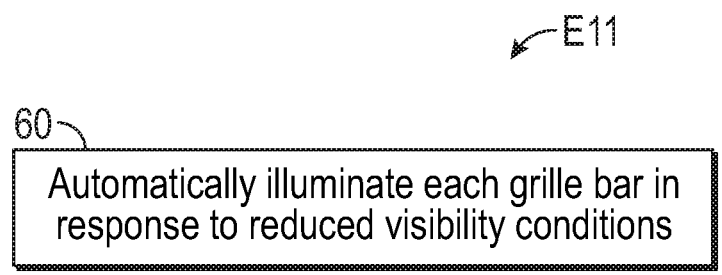
FIG. 15 schematically illustrates an eleventh lighting effect that can be indicated by an illuminated grille assembly.

FIG. 15 schematically illustrates an eleventh exemplary lighting effect E11 that can be generated by the illuminated grille assembly 20. During the eleventh lighting effect E11, the illuminated grille assembly 20 may function as an auxiliary fog light. For example, if the eleventh lighting effect E11 has been commanded by the control system 12, each grille bar 26 is automatically illuminated (e.g., in white or yellow) in response to fog conditions or other reduced visibility conditions. This is schematically illustrated at block 60 of FIG. 15.

The illuminated grille assemblies described herein communicate a variety of vehicle operating behaviors to persons outside of the vehicle (e.g., pedestrians, bicyclists, operators of other vehicles, etc.). The operating behaviors that may be communicated include but are not limited to vehicle stopped, about to move, general vehicle speed, responding to emergency, out of service, mechanical failure, etc.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle lighting system, comprising:
    an illuminated grille assembly including a plurality of grille bars each having at least one light source; and
    a control system configured to control the illuminated grille assembly to emit combinations of lighting effects from the plurality of grille bars for indicating a plurality of visually distinctive operating behaviors of the vehicle,
    wherein the control system includes at least one control module that includes a processing unit and a memory.

2. The vehicle lighting system as recited in claim 1, wherein the plurality of visually distinctive operating behaviors are visually distinctive in terms of at least color and brightness.

3. The vehicle lighting system as recited in claim 1, wherein the plurality of visually distinctive operating behaviors are visually distinctive in terms of a total amount of the plurality of grille bars that are illuminated.

4. The vehicle lighting system as recited in claim 1, wherein each of the plurality of grille bars include housing, the at least one light source, and at least one optic device.

5. The vehicle lighting system as recited in claim 4, wherein the housing includes a metallic film secured to a plastic part and a plastic backing secured to the plastic part.

6. The vehicle lighting system as recited in claim 4, comprising a printed circuit board (PCB) housed within the housing.

7. The vehicle lighting system as recited in claim 1, wherein the at least one light source is a light emitting diode (LED).

8. The vehicle lighting system as recited in claim 7, wherein the LED is a multi-colored LED.

9. The vehicle lighting system as recited in claim 1, wherein the control system is configured to turn a first portion of the light sources ON and turn a second portion of the light sources OFF to create a symbol within the illuminated grille assembly.

10. The vehicle lighting system as recited in claim 1, wherein the vehicle is an autonomous vehicle.

11. The vehicle lighting system as recited in claim 1, wherein said control system is configured to control the illuminated grille assembly to simulate a blink or a nod.

12. The vehicle lighting system as recited in claim 1, wherein said control system is configured to control the illuminated grille assembly to automatically illuminate each of said plurality of grille bars in red in response to a gear selection of the vehicle being positioned in a reverse gear.

13. A vehicle lighting system, comprising:
    an illuminated grille assembly including a plurality of grille bars,
    wherein each of the plurality of grille bars includes a housing, a light source, and a printed circuit board; and
    a control system configured to control the illuminated grille assembly to emit combinations of lighting effects from the plurality of grille bars for indicating a plurality of visually distinctive operating behaviors of the vehicle,
    wherein the plurality of visually distinctive operating behaviors are visually distinctive in terms of color, brightness, and flashing or pulsing action,
    wherein the control system includes at least one control module that includes a processing unit and a memory.

14. The vehicle lighting system as recited in claim 13, wherein the vehicle lighting system is part of an autonomous vehicle, and the autonomous vehicle includes a global positioning system (GPS) configured to communicate a vehicle position to the control system and a sensor system configured to communicate information about an environment within which the autonomous vehicle is operating to the control system.

* * * * *